United States Patent
Allen

(10) Patent No.: US 9,734,309 B1
(45) Date of Patent: Aug. 15, 2017

(54) ROLE-BASED ACCESS CONTROL ASSIGNMENT

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 14/223,830

(22) Filed: Mar. 24, 2014

(51) Int. Cl.
  *G06F 21/60* (2013.01)
  *G06F 21/62* (2013.01)
  *G06F 21/31* (2013.01)
  *H04L 29/06* (2006.01)

(52) U.S. Cl.
  CPC ............ *G06F 21/31* (2013.01); *G06F 21/604* (2013.01); *H04L 63/102* (2013.01); *H04L 63/104* (2013.01); *G06F 21/629* (2013.01); *G06F 21/6218* (2013.01); *H04L 63/20* (2013.01)

(58) Field of Classification Search
  CPC ....... G06F 21/31; H04L 63/20; H04L 63/102; H04L 63/104
  See application file for complete search history.

(56) References Cited

U.S. PATENT DOCUMENTS

| | | | | |
|---|---|---|---|---|
| 7,478,421 B2* | 1/2009 | Kodimer | ................ | G06F 21/31 713/166 |
| 7,657,946 B2* | 2/2010 | Yan | ..................... | G06F 21/6218 726/28 |
| 8,543,684 B2* | 9/2013 | Hulusi | ............... | G07C 9/00103 340/10.1 |
| 8,983,877 B2* | 3/2015 | Chari | ................... | G06N 99/005 706/12 |
| 9,137,263 B2* | 9/2015 | Chari | ...................... | H04L 63/20 |
| 2003/0046576 A1* | 3/2003 | High, Jr. | ................. | H04L 63/20 726/1 |
| 2009/0055911 A1* | 2/2009 | Hulusi | ............... | G07C 9/00103 726/6 |
| 2011/0036343 A1* | 2/2011 | Kroyzer | ..................... | F24J 2/07 126/574 |
| 2012/0246098 A1* | 9/2012 | Chari | ................... | G06F 21/604 706/12 |
| 2014/0196103 A1* | 7/2014 | Chari | ................... | H04L 63/102 726/1 |

* cited by examiner

*Primary Examiner* — Linglan Edwards
(74) *Attorney, Agent, or Firm* — Davis Wright Tremaine LLP

(57) ABSTRACT

Techniques for assigning roles to users within a computing system are described herein. A matrix representation of a probabilistic assignment of roles to users is created based at least in part on existing permissions. The matrix representation is then iteratively perturbed and the resulting perturbation is evaluated using an objective function, with perturbation decisions based at least in part on making the objective function converge to a threshold value. When the solution converges, the resulting assignment matrix may be used to assign roles to users.

20 Claims, 13 Drawing Sheets

ROLE-BASED ACCESS CONTROL ASSIGNMENT

BACKGROUND

Modern computing systems place a high importance on security of user access to system resources and in maintaining a repository of secure and accurate records of roles, permissions and/or policies associated with computing system users. In a computing system where many users may have several assigned roles, permissions and/or policies associated with and relating to many different computing system resources, devices, entities, file systems and the like, the repository of user roles, permissions and/or policies can grow increasingly complex, particularly as the size and/or complexity of the system and/or the number of computing system users increases. Migrating such a complex repository to a new computing system environment with a new and/or different repository structure such as, for example, when an existing computing environment is extended onto and/or migrated into a computing resources service provider environment can be labor intensive and/or prone to errors due to the combinatorial nature of associating users with roles, permissions and/or policies. Delays and/or errors in assigning correct roles, permissions and/or policies may lead to an inability for a user to execute needed functionality and may lead to reduced system performance, reduced job performance, reduced resource availability and a degraded computing system user experience.

BRIEF DESCRIPTION OF THE DRAWINGS

Various embodiments in accordance with the present disclosure will be described with reference to the drawings, in which.

DETAILED DESCRIPTION

Figure 1:
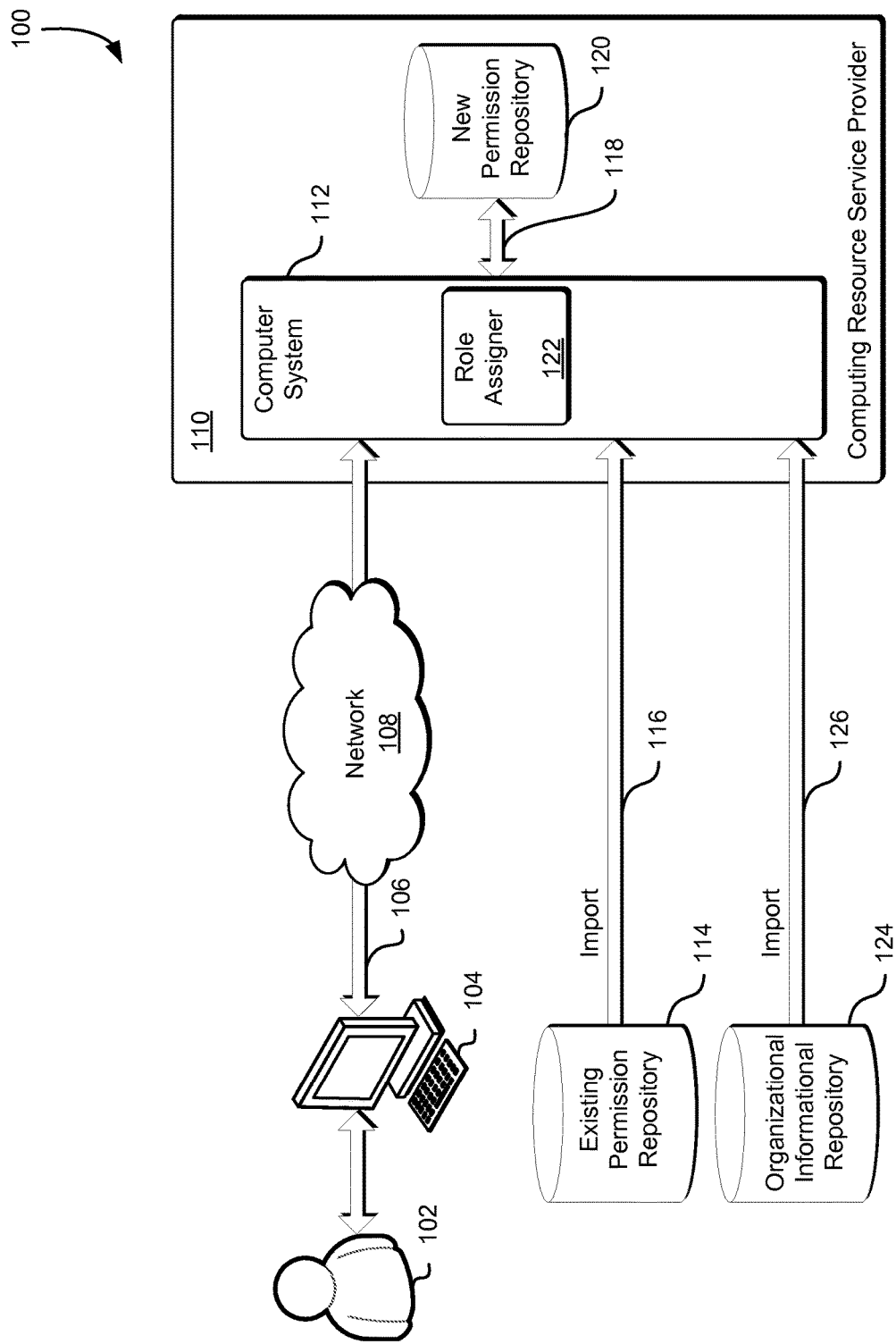
FIG. 1 illustrates an example environment where a new permission repository may be generated from an existing permission repository in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for creating and maintaining a repository of secure and accurate records of responsibilities, permissions, roles and/or polices associated with computing system users. A computing system may be, for example, a distributed system with multiple hosts, or may be a single system with multiple virtual machines, or may be a networked combination of machines or may be a combination of these and/or other such systems. A computing system may have one or more users, modules, applications, services, operating systems, programs and/or other such entities. A computing system environment may have a variety of security models implemented that provide functionality to create and maintain these responsibilities, permissions, roles and/or policies. In a role-based access control security model, computing system access permissions may be maintained by creating role that comprise one or more permissions, establishing policies associated with those roles and associating users with those roles. In such a system, a user of a computing system may be associated a number of roles and those roles may determine how the computing system provides and/or allocates access by the user to computing system resources.

For example, a user may have a role which allows access to certain file systems associated with the computing system, or may have a role which allows access to certain applications running on the computing system, or may have a role which allows restricted access related to certain permissions associated with computing system resources and/or may have other such roles. The roles, permissions and/or policies associated with the user may also define how a user may access computing system resources, or what degree of access a user may have to computing system resources, or where a user may access computing system resources from and/or other such access restrictions. As may be contemplated, the roles, permissions and/or policies described herein as well as the access restrictions described herein are merely illustrative examples and other such responsibilities, permissions, roles, policies and/or access restrictions may be considered as within the scope of the present disclosure.

The implementation of a role-based access control security model may be a complex and labor intensive process, particularly when implemented within an existing organization with an existing security model such as, for example, an access control list. Such an organization may have a large number of permissions associated with a large number of resources and with a large number of users. A manual assignment of permissions to roles and association of roles with users may take a great deal of time and may be prone to a number of errors. An automated approach that avoids such a time-consuming manual assignment may save time and labor, but such an automated approach may be ineffectual if it rapidly produces an error-filled and/or extremely complex and unmanageable association of roles with users. For example, an automated approach which created roles based on reporting structure and/or job code may produce a natural-feeling and relatively simple association, but one with many errors for those users which, for example, require different and/or specialized access. Similarly, an automated approach which created one role per existing permission may produce an extremely complex system with a combinatorial explosion of roles and user-role associations.

Techniques described and suggested herein include systems and methods for automatically constructing a role-based access control security model based on existing user permissions and existing user information. Roles may be generated based on the existing user permissions and existing user information and the generated roles may be associated with users based on the minimization of an objective function. An objective function is a function which may be used in an optimization problem which may, in some embodiments, map one or more occurrences within a system of one or more events (for example, role assignments) to a single value which may represent the net cost or the net benefit of such events occurring. In some embodiments, an objective function may accumulate penalties associated with the events and, in such embodiments optimization of a system may be accomplished by minimizing the objective function. In some embodiments, an objective function may accumulate benefits associated with the events and, in such embodiments optimization of a system may be accomplished by maximizing the objective function. The objective function may be used to measure the suitability of role assignments, the presence of redundant roles, the complexity of the generated role system and/or other such factors and by iteratively improving the generated role system and, for example, minimizing the objective function, an efficient and maintainable role system may be generated.

To construct a role-based access control security model from an existing computing system security model, a computing system entity may first retrieve existing user information from the existing computing system security model and from the existing computing system. The information may be retrieved from the existing computing system security model and from the existing computing system by a role assigner. The role assigner may be a computing system process, program, application, service, module or a combination of these and/or other such computing system entities. The role assigner may be running directly on a computing system host, or may be running within a virtual machine (VM) on a computing system host or may be running on some other combination of physical and/or virtual computing systems. The role assigner may operate as a distributed and/or cooperative process, program, application, service, module and/or combination of these and/or other such computing system entities within a distributed computing system environment. Elements of the role assigner may operate within a computing service resource provider (or remote) datacenter location, within a customer provided (or local) datacenter location, within a combination of local and remote datacenter locations or within a combination of these and/or other such datacenter locations.

The role assigner may then execute instructions to retrieve user information from an organization information database or repository and may also retrieve permission information from a permission database or repository. In some embodiments, these repositories may be shared and/or may be separate. In some embodiments, these repositories may be located in shared and/or separate locations including the shared and/or separate datacenter locations described herein. The role assigner may retrieve user information including, but not limited to, user names, user identifications and other such user information. The role assigner may also retrieve user metadata such as user reporting structures, user management structures, user job descriptions, user job codes, workspace locations, cost centers and/or other such user metadata. The role assigner may also retrieve user permissions and assignments of those permissions to users and/or groups of users. The user permissions and/or the assignments of those permissions may be retrieved as lists of users and permissions such as access control lists, system permission policies and/or other such permission assignment methods.

The role assigner may then execute instructions to generate an initial set of a plurality of roles based at least in part on the user metadata and the user permissions. In some embodiments, the role assigner may be configured to examine the user metadata and the user permissions and may produce a role for each unique combination of those items. For example, manager "A", job code "B" and location "C" combined with permissions "X", "Y" and "Z" may produce one role while manager "A", job code "B" and location "C" combined with permissions "Q", "P" and "R" may produce a different role. In some embodiments, the role assigner may be configured to employ a different approach and may, for example, use a paring approach to generate the initial set of the plurality of roles. In such an embodiment, for example, the combination of manager "A", job code "B" and location "C" may produce one role, the combination of permissions "X", "Y" and "Z" may produce another role and the combination of permissions "Q", "P" and "R" may produce a third role. As may be contemplated, the examples for generating the initial set of the plurality of roles from the user metadata and user permissions are merely illustrative examples and other such methods of generating the initial set of the plurality of roles may be considered as within the scope of the present disclosure.

The role assigner may then execute instructions to generate an initial role probability matrix that may assign to each combination of role and user a probability that the role is assigned to the user. The role probability matrix may provide a mapping between roles and users where, for example, if a certain user is definitely assigned a certain role, the entry corresponding to that role and user may contain a probability of one, if a certain user is definitely not assigned to a certain role, the entry corresponding to that role and user may contain a probability of zero and if a certain user might be assigned a certain role, the entry corresponding to that role and user may contain a probability between zero and one. In some embodiments, the role assigner may provide a different mapping between roles and users such as, for example, using a graph, or a function, or a list and/or some other such mapping. The role assigner may also generate a permission matrix (or other such mapping) based at least in part on the existing permission information that may assign to each combination of permission a user a probability that the permission is assigned to the user where the probabilities are as described herein above. The entries in the permission matrix may represent the probability that an associated permission may be assigned to the user, for reasons that cannot be derived from the role structure.

The probabilities in the role probability matrix and in the permission matrix may be directly measured, or may be determined using some approximating function, heuristic and/or other such technique. For example, in an embodiment where some or all of the probabilities in the role probability matrix may not be measured, the role assigner may estimate an unmeasured probability using information derived from the system, the organizational information repository, the existing permission repository and/or other such sources. The role assigner may also generate probabilities based on system functions, estimation, random sampling and/or other such techniques. As may be contemplated, the methods and/or techniques illustrated herein for assigning probabilities are illustrative examples and other such methods and/or techniques may be considered as within the scope of the present disclosure.

For example, an initial role probability matrix may assign a role to a user with probability of zero based on the user metadata and permission information in the role structure when the user actually has a particular permission. In such an example, the role probability matrix does not correctly assign the particular permission to the user and thus may be a poor initial guess for the role structure while the permission matrix does correctly assign the particular permission to the user and thus may be a perfect assignment of the permission model. In some embodiments, other initial role probability matrices may be generated that define good role structures but that introduce errors into the permission model such as, for example, assigning users to roles that they do not actually perform and/or not assigning users to roles that they do actually perform. The purpose of the initial assignment may be simply to seed the role assigner with a guess for optimization. A good initial guess may reduce the amount of work that the role assigner needs to perform during optimization while a poor initial guess may increase the amount of work that the role assignment needs to perform during optimization. Conversely, a good initial guess may produce a bad solution by forcing the solution into a particularly bad location within the search space while a bad initial guess may produce a good solution because of a better location within the search space. In the context of the initial guesses, a "good" guess is one that may be near a solution within a search space, and so may consequentially converge to that solution quickly while a "bad" guess is one that may be far from any solution within the search space, and so may consequentially converge to a solution slowly. In the context of the solution, it is important to note that there may be multiple solutions to an optimization problem and as such, a "good" solution is one that produces better role assignments than a "bad" solution. For example, a gradient descent method may quickly converge to a solution that represents a local minima, but that solution may not be a very effective and/or efficient solution. In some embodiments, the initial assignment may be based on system factors, or on the existing user metadata, or on the existing user permissions, or on random permutation factors, or by assigning a coefficient a random value or on a combination of these and/or other such initial assignment methods. As may be contemplated, the examples for generating the initial assignments are merely illustrative and other such methods of generating the initial assignments may be considered as within the scope of the present disclosure.

The role assigner may then execute instructions to construct an objective function which comprises a plurality of penalty functions based at least in part on permissions associated with one or more role assignments. A penalty function is a function which may be used in conjunction with an objective function for solving optimization problems such as constrained optimization problems. A penalty function may establish a penalty associated with violating one or more constraints within a system and, in some embodiments, may have its importance (or weighting) adjusted as the system optimization proceeds. A penalty function may be based on a variety of system-defined factors for measuring the correctness of a set of candidate role assignments as represented in the role probability matrix. A penalty function may be based on evaluating whether one or more of the permissions associated with one or more role assignments preserve at least a subset of the set of permissions previously associated with one or more users. The one or more of the permissions associated with one or more role assignments and/or the probability that a user is assigned a particular permission based on a particular role within the role probability matrix may also be referred to herein as an "assignment". For example, a penalty function may sum the absolute value of the differences between the probability that a user is assigned a particular permission based on a particular role within the role probability matrix (the assignment) and whether the user actually has and/or should have that permission. In such a penalty function, an assignment where a user is not assigned a permission (probability of zero) corresponding to a permission that the user actually should have (probability of one) or an assignment where a user is assigned a permission (probability of one) corresponding to a permission that the user should not have (probability of zero) would both result in a high penalty. A penalty function may also assign a penalty based on the complexity of the proposed system or assignment by, for example, summing the total number of roles in the assignment matrix and/or the permission matrix with at least one non-zero probability or at least one probability greater than some threshold value. Such a penalty function would penalize complex systems with a large number of perhaps unnecessary roles. A penalty function may also assign a penalty based on the uncertainty of a system by, for example, summing, for each probability entry in the assignment, one minus twice the absolute value of the difference between the probability and 0.5. Such a penalty function may penalize uncertainty (probabilities near 0.5) by assigning a penalty value of zero to probability entries of zero and one and by establishing a penalty value of one to probability entries of 0.5.

The one or more penalty functions may be combined into an objective function by summing the resulting values, or by establishing weighting values which increase the importance of one or more penalties or by some other combination of the penalties. The objective function may also include additional system-defined factors associated with role assignments which may be measured by other objective function factors including, but not limited to, security considerations, business value of roles, ease of use, costs associated with implementing roles and/or other such objective function factors. As may be contemplated, the example penalty functions described herein, the example methods of combining and/or weighting the penalty functions within the objective function described herein and the additional objective function factors described herein are merely illustrative examples and other such methods of constructing an objective function may be considered as within the scope of the present disclosure.

The role assigner may then execute instructions to iteratively improve the role assignment probability matrix and/or the permission matrix based at least in part on the objective function. In some embodiments, the role assigner may execute instructions to iteratively improve the role assignment probability matrix and/or the permission matrix by using parameter estimation techniques such as, for example, simulated annealing, or by using metaheuristic techniques such as, for example, genetic algorithms or probabilistic algorithms, or by using numerical optimization techniques such as, for example, gradient decent or by using a combination of these and/or other such solution techniques. The role assigner may also switch between using numerical algorithms and metaheuristic algorithms. For example, a numerical algorithm such as a gradient descent may be used to efficiently move to a solution, followed by using a metaheuristic such as simulated annealing to move away from a local minimum, and so on. In some embodiments, an organization may include tens of thousands of users with thousands of permissions and thus may generate millions of candidate roles. In such embodiments, the probability matrixes may comprise billions of probability factors making it computationally intractable to find a deterministically optimal solution for the objective function and, as such, parameter estimation techniques, metaheuristic techniques or numerical optimization techniques may be used to iteratively approach a solution.

The process of approaching a solution by reducing the objective function may include a variety of techniques including, but not limited to, random perturbations of probability coefficients, alterations of the weighting of penalties within the objective function, removal of roles with no associated users, combining and/or paring roles and/or other such techniques. At each iteration, one or more such techniques may be performed, the objective function may be evaluated and then the role assigner may execute instructions to evaluate whether a solution has been found by, for example, executing instructions that determine that the objective function has been reduced to zero (indicating an ideal solution) or by executing instructions that determine that the objective function has been reduced below a threshold value (indicating a suitable solution).

In some embodiments, the role assigner may execute instructions to evaluate whether a solution has been found by determining the relative error between the objective function value and a target objective function value such as a target matrix score. In such embodiments, the relative error between the objective function value and the target objective function value may be determined by scaling the difference between the objective function value and target objective function value based at least in part on the size of the proposed solution matrix. In some embodiments, the role assigner may determine that a proposed solution has been found when, for example, the solution iterations fail to improve the solution and/or the objective function. As may be contemplated, the methods for determining that a solution has been found described herein are merely illustrative examples and other such methods for determining that a solution has been found may be considered as within the scope of the present disclosure.

When a candidate solution has been found, the role assigner may finally execute instructions that cause the computing system to create a role for each role in the role probability matrix with assigned users and may also assign roles to each user based on the coefficients in the role probability matrix. In some embodiments, the role assigner may also execute instructions to generate a list of anomalies in the role probability matrix such as, for example, those roles that have uncertain probabilities (probabilities near 0.5), or those roles that do not correctly assign required permissions to users and/or other such anomalies. The list of anomalies may be forwarded to a computing system administrator for further processing and/or mitigation.

FIG. 1 illustrates an example environment 100 where one or more computer systems running within a computing resource service provider environment, as well as the associated code running thereon, may be used to create a new permission repository based at least in part on an existing permission repository. A user 102 may connect 106 to a computer system instance 112 through a computer system client device 104 and may initiate a connection with and/or interaction with one or more applications running on the computer system instance 112. The computer system instance 112 may be operating within a computing resource service provider 110. In some embodiments, the computing resource service provider 110 may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. In some embodiments, the command or commands to initiate the connection 106 to the computing resource service provider 110 may be sent to the computer system instance 112, without the intervention of the user 102. The command or commands to initiate the connection 106 to the computer system instance 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The user 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the computer system instance 112 may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

One or more applications such as a role assigner 122 running on a computer system instance 112 may create 118 a new permission repository 120 according to the received instructions. In some embodiments, the role assigner 122 may create the new permission repository 120 based at least in part on the import 116 of an existing permission repository 114 and based at least in part on the import 126 of an organizational information repository 124. The existing permission repository 114 may contain user data, user permission data and/or other such data related to computing system permissions. The existing permission repository 114 may also contain access control lists and/or other such permission assignment methodologies. The organizational information repository 124 may contain user data, user metadata and/or other such data related to computing system users. The existing permission repository 114 and/or the organizational information repository 124 may be each contained within and/or may have an associated organizational structure such as, for example, a database that may be used to facilitate the import 116 of the existing permission repository 114 and/or the import 126 of the organizational information repository 124. The existing permission repository 114 and/or the organizational information repository 124 may be contained within and/or may have the same associated organizational structure or may be contained within and/or may have different associated organizational structures. In some embodiments, access to the existing permission repository 114 and/or the organizational information repository 124 may be provided by a computer system resource such as a uniform resource identifier (URI), or by an application programming interface (API) or by other such access methodologies.

Figure 2:
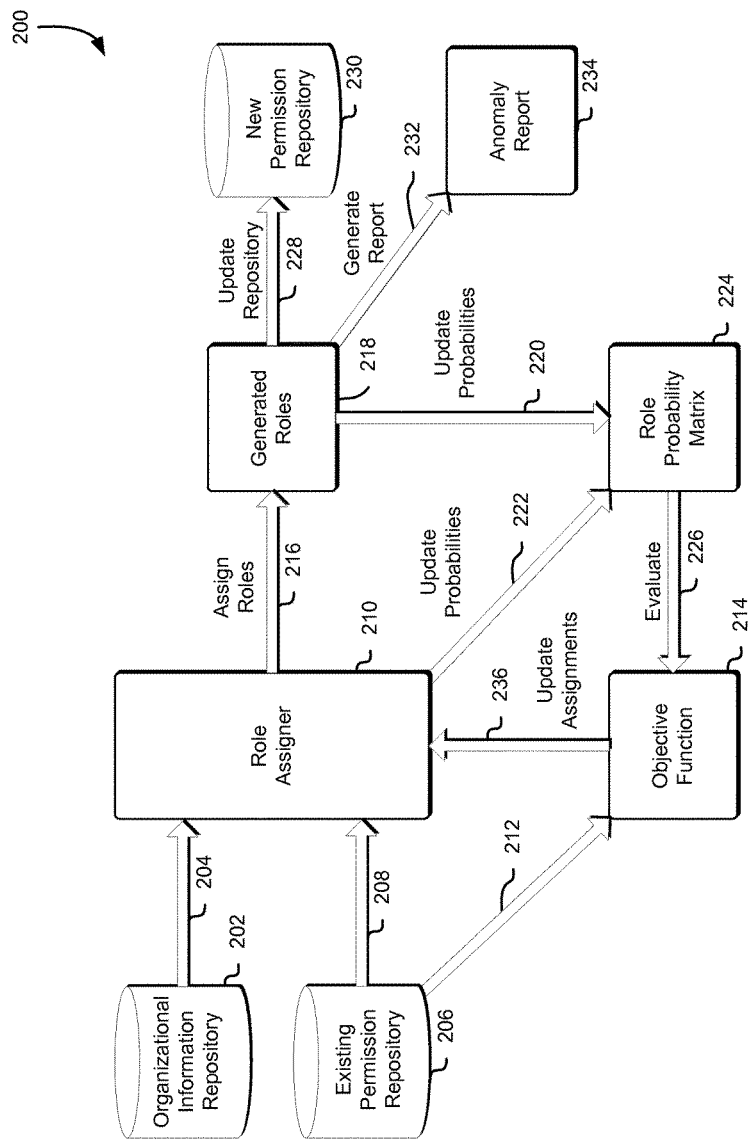
FIG. 2 illustrates an example environment where a new permission repository and an anomaly report may be produced from existing organization information in accordance with at least one embodiment.

FIG. 2 illustrates an example environment 200 where assigned roles may be generated by a role assigner from existing permission data as described herein at least in connection with FIG. 1 and in accordance with at least one embodiment. User information from an organizational information repository 202 such as the organizational information repository 124 described herein at least in connection with FIG. 1 may be provided 204 to a role assigner 210 such as the role assigner 122 described herein at least in connection with FIG. 1. Permission information from an existing permission repository 206 such as the existing permission repository 114 described herein at least in connection with FIG. 1 may also be provided 208 to the role assigner 210. The role assigner 210 may utilize the user information and permission information to assign roles 216 such as, for example, by generating a role assignment probability matrix and/or a permission matrix.

The role assigner 210 or a process associated with and/or under the control of the role assigner may then use the generated roles 218 to update the probabilities 220 in a role probability matrix 224. In some embodiments, the role assigner 210 may update the probabilities 220 by using parameter estimation techniques such as, for example, simulated annealing, or by using metaheuristic techniques such as, for example, genetic algorithms, or by using numerical optimization techniques such as, for example, gradient decent or by using a combination of these and/or other such solution techniques. In some embodiments, the role assigner 210 may also provide input from the organizational information repository 202, from the existing permission repository 206 and/or from other sources to update the probabilities 222 in the role probability matrix 224 and/or in a permission matrix. The role assigner 210 may then evaluate 226 the roles represented by the role probability matrix 224 against an objective function 214 to determine whether the assigned roles are a usable solution to the problem of assigning roles and/or permissions to users. In some embodiments, the objective function 214 may use information 212 from the existing permission repository 206 to evaluate 226 whether the role probability matrix 224 has produced a usable solution to the problem of assigning roles and/or permissions to users. For example, the objective function 214 may use permissions from the existing permission repository to determine whether the role probability matrix 224 would probabilistically assign a role to a user that has previously had a permission associated with that role, or whether the role probability matrix 224 would not probabilistically assign a role to a user that did not previously have any permissions associated with that role and/or other such user, role and/or permission determinations.

In the event that the role assigner 210 may evaluate 226 the roles represented by the role probability matrix 224 against an objective function 214 and it is determined that the roles and/or permissions do not produce a usable solution to the problem of assigning roles and/or permissions to users, the role assigner may update the assignments 236 and then iteratively repeat the process. The role assigner 210 may execute instructions to assign roles 216 to the generated roles 218, update probabilities 220 to the role probability matrix 224 and/or the permission matrix, update probabilities 222 to the role probability matrix 224 and/or the permission matrix, evaluate 226 the assigned roles and update assignments 236 until a usable solution to the problem of assigning roles and/or permissions to users is found. Once a usable solution is found, the role assigner may update 228 a new permission repository 230 with the new roles and may also generate 232 an anomaly report 234 representing those roles and/or permissions that were not correctly and/or deterministically assigned to the proper users.

Figure 3:
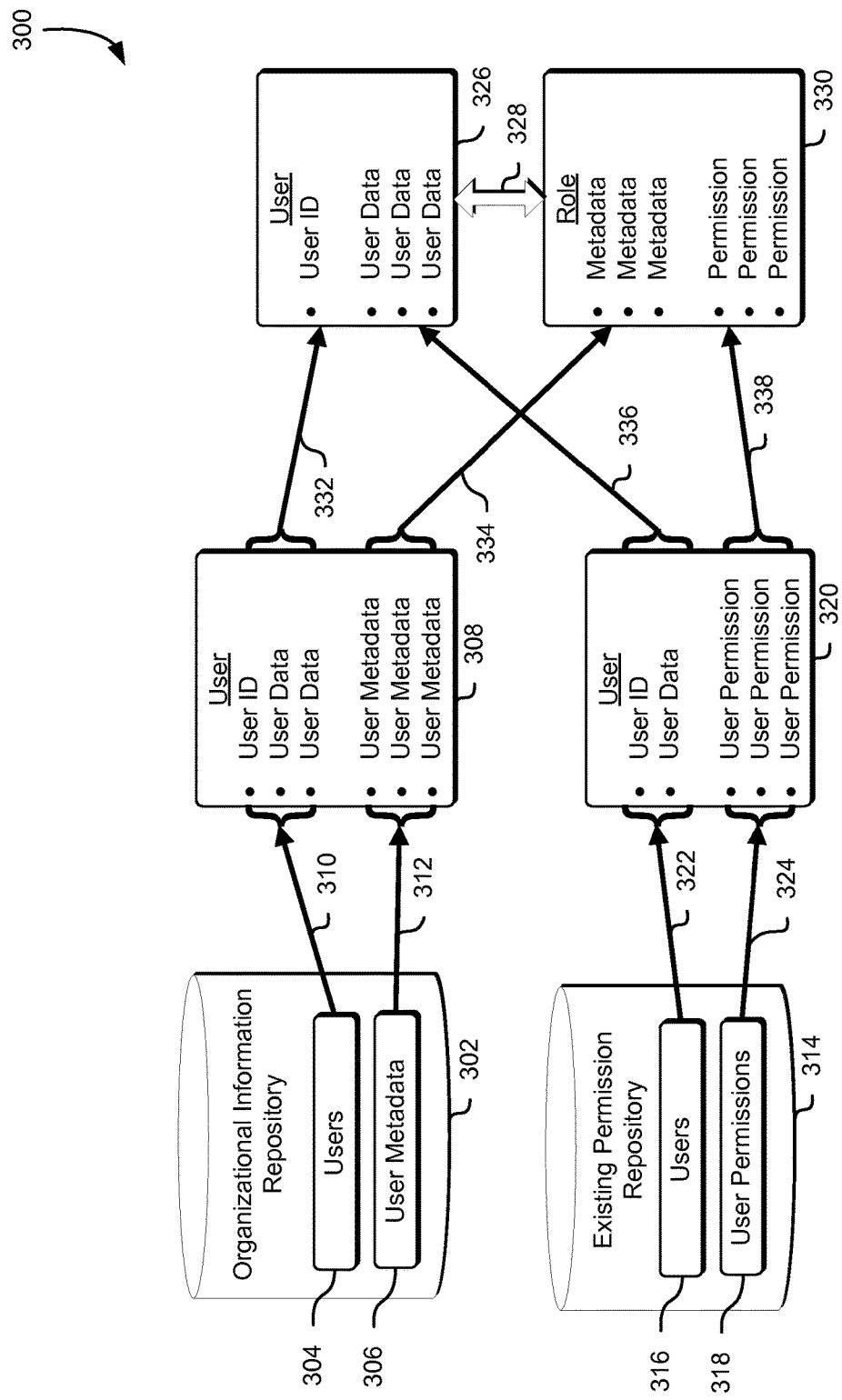
FIG. 3 illustrates an example environment where data may be combined to create candidate users and candidate user roles in accordance with at least one embodiment.

FIG. 3 illustrates an example environment 300 where user data, user metadata and user permissions may be combined to produce users, roles and role assignments as described herein at least in connection with FIGS. 1 and 2 and in accordance with at least one embodiment. User data 304 and user metadata 306 from an organizational information repository 302 may be extracted to a user record 308. The user data extracted 310 may include user data such as a user ID, user name, user phone number and/or other such data that may be specific to a user and not potentially shared by other users within an organization. The organization may be a company or may be some other class of users such as subscribers to a service, users of a computer system resource and/or other such collections of users. The user metadata extracted 312 may include user metadata such as user type code, user location, user reporting structure and/or other such metadata that may be associated with one or more users within the organization. The type and contents of both the user data extracted 310 and the user metadata extracted 312 may depend on the nature of user and/or on the nature of the organization that the user data 304 and user metadata 306 originates from.

User data 316 and user permission data 318 from an existing permission repository 314 may be extracted to a user permission record 320. As above, the user data extracted 322 may include user data such as a user ID, user name, user phone number and/or other such data that may be specific to a user and not potentially shared by other users within an organization. In some embodiments, the user data extracted 322 may include data relating specifically to user permissions including, but not limited to, usernames, passwords, access control list, private and/or public keys, user specific policies and/or other such user permission data. The user permission data extracted 324 may include such information as data from access control lists, resource lists, private and/or public keys, system policies, permissions and/or other such permission data. The user permission data extracted 324 may include permission data that may be associated with one or more users within an organization. As above, the type and contents of the user data extracted 322 and the user permission data extracted 324 may depend on the nature of the user and/or on the nature of the organization that the user data 316 and the user permission data 318 originates from.

The user data 332 from the user record 308 may then be combined with the user data 336 from the user permission record 320 into a combined user record 326. The user data 332 and the user data 336 in the combined user record 326 may be combined by comparing user data elements such as a user ID and/or other such identifying data elements from the user data 332 and the user data 336. The user metadata 334 from the user record 308 may also then be combined with the user permission data 338 from the user permission record 320 into role 330. The user metadata 334 and the user permission data 338 in the role 330 may also be combined by comparing user data elements such as a user ID and/or other such identifying data elements from the user data 332 and the user data 336. The user data elements from user data 332 and user data 336 may also be used to provide a preliminary assignment 328 (or association) between the combined user record 326 and the role 330. It should be noted that, unlike the combined user record 326, the role 330 may not contain the identifying characteristics such as the user ID and/or other such identifying data elements from the user data 332 and the user data 336 that may be used to generate the role 330 because generally, roles may be shared by multiple users and so may not benefit from containing such identifying characteristics.

For example, a user "A" with metadata "Q" and "R" and permissions "X" and "Y" may generate a role "M" based on that metadata and permissions, with the role "M" based on combining the metadata and permissions, and the combining based on the identifying characteristics of user "A." The role "M" may be assigned to (or associated with) user "A" based on those shared identifying characteristics. In some embodiments, second user "B" with the same metadata and permissions may not generate a new role "N" (as such a role would be identical to role "M"), but may instead have the role "M" assigned to (or associated with) the user "B" based on those shared identifying characteristics. In some embodiments, a new role "N" may be generated and/or assigned to (or associated with) user "B" and then later culled by the system in a secondary process configured to remove redundant roles.

In some embodiments, at least a portion of the data elements of the user data 332 and the user data 336 may be culled from the combined user record 326 such as, for example, when there are redundant, duplicate and/or unnecessary data elements. At least a portion of the data elements of the user metadata 334 and the user permission data 338 may also be culled from the role 330 when, for example, there are redundant, duplicate and/or unnecessary data elements in that role 330. In some embodiments, at least a portion of the elements in the combined user record 326 and/or in the role 330 may be extracted from other repositories accessible by one or more processes, applications, services, modules and/or other such entities associated with a computing system and accessible by a role assigner such as the role assigner described herein at least in connection with FIG. 1. At least a portion of the elements in the combined user record 326 and/or in the role 330 may also be computed and/or otherwise determined by one or more processes, applications, services, modules and/or other such entities associated with a computing system and accessible by a role assigner such as the role assigner described herein at least in connection with FIG. 1.

Figure 4:
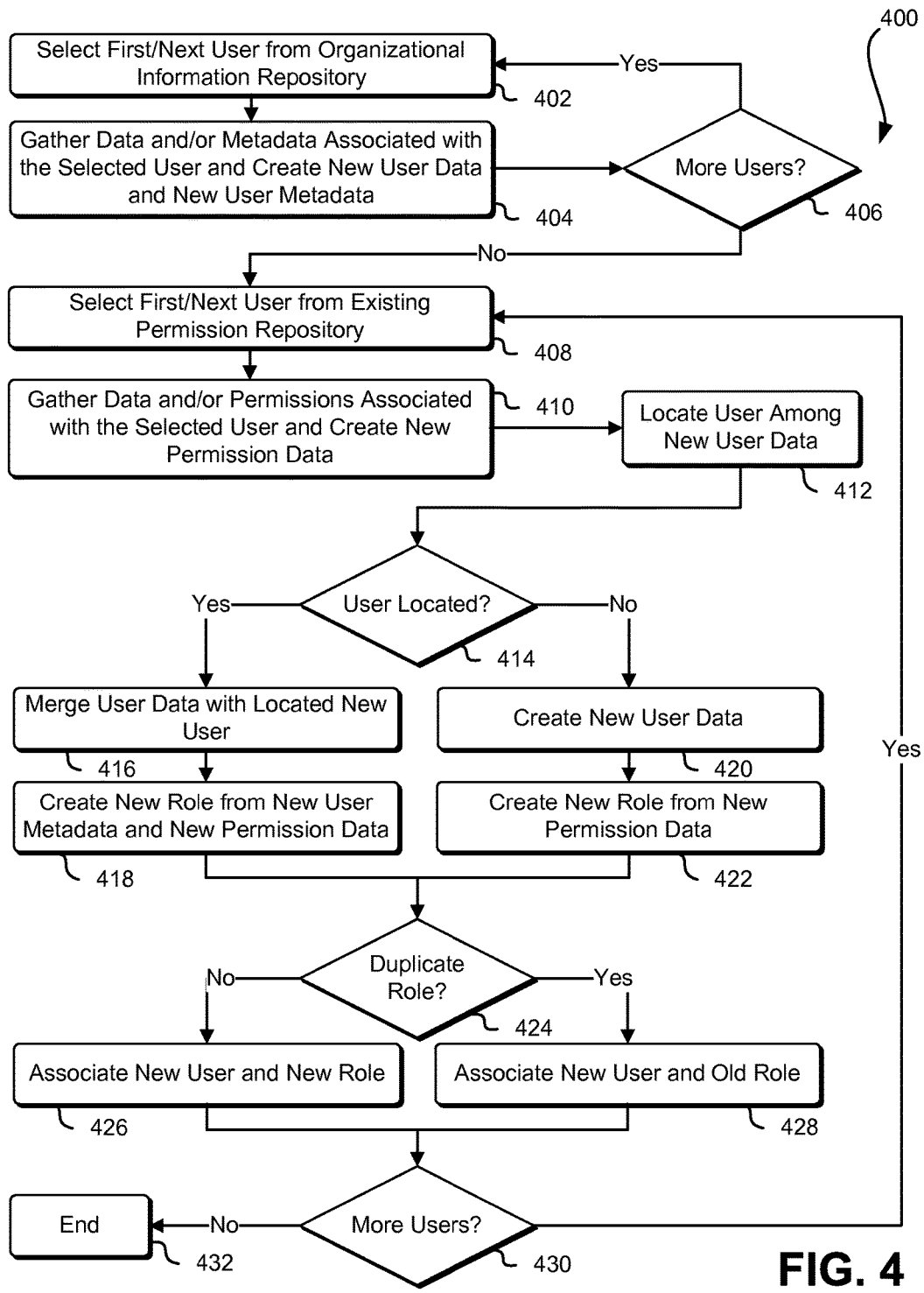
FIG. 4 illustrates an example process for generating users and roles and for associating users with roles in accordance with at least one embodiment.

FIG. 4 illustrates an example process 400 for generating users and roles and for associating users and roles within a computer system as described herein at least in connection with FIG. 1 and in accordance with at least one embodiment. A role assigner such as the role assigner 122 described at least in connection with FIG. 1 may perform some or all of the process illustrated in FIG. 4. Other entities operating within a computing system may also perform at least a portion of the process illustrated in FIG. 4 including, but not limited to, services, applications, modules, processes, operating system elements, virtual machine elements, network hardware, controlling domains (e.g. a hypervisor) or combinations of these and/or other such entities operating within the computing system.

A role assigner may execute instructions to first select a user from an organizational information repository 402 such as the organizational information repository 124 described herein at least in connection with FIG. 1. The role assigner may select the user from the organizational information repository in a predetermined order, or in a random order, or according to system policies, or according to a business value associated with the user or according to a combination of these and/or other such considerations. The role assigner may also select a subset of the set of users from the organizational information repository where the members of the subset may be determined by a factor such as the type, class, nature and other such factors relating to the user. The role assigner may then gather data and/or metadata associated with the selected user and may create new user data records and/or new user metadata records 404. The role assigner may then continue selecting users, gathering data and/or metadata and creating new user data and/or new user metadata records as long as there are more users 406 to select from the organizational information database.

After having selected the available users from the organizational information database, gathering data and/or metadata and creating new user data and/or new user metadata records, the role assigner may then begin selecting users from an existing permission repository 408 such as the existing permission repository 114 described herein at least in connection with FIG. 1. The role assigner may then gather data and/or permissions associated with the selected user and may create new permission data records 410. For each user selected, the role assigner may attempt to locate the user among the new user data created above 412. If the user is located 414 among the new user data, the role assigner may then merge the user data from the permission data with the previously located user data 416 and may then create a new role 418 based at least in part on the new user data metadata associated with the located user and/or on the new permission data. If the user is not located 414 among the new user data, the role assigner may instead create a new user data record 420 from the user data in the new permission data and may then create a new role 422 based at least in part on the permission data in the new permission data.

If the role assigner determines that the newly created role is a duplicate 424 of a previously created role, the role assigner may, in some embodiments, associate the new user data record with the old role 428. In some embodiments, the role assigner may also retain the duplicate roles and may instead cull the duplicated roles at a later time, for example, during the search for a solution as described herein at least in connection with FIG. 2 and in accordance with at least one embodiment. If the role assigner determines that the newly created role is not a duplicate 424 of a previously created role, the role assigner may associate the new user data record with the new role 426. The role assigner may then continue searching for more users 430 in the existing permission repository, building roles and associated roles with users until there are no more users 432.

Figure 5:
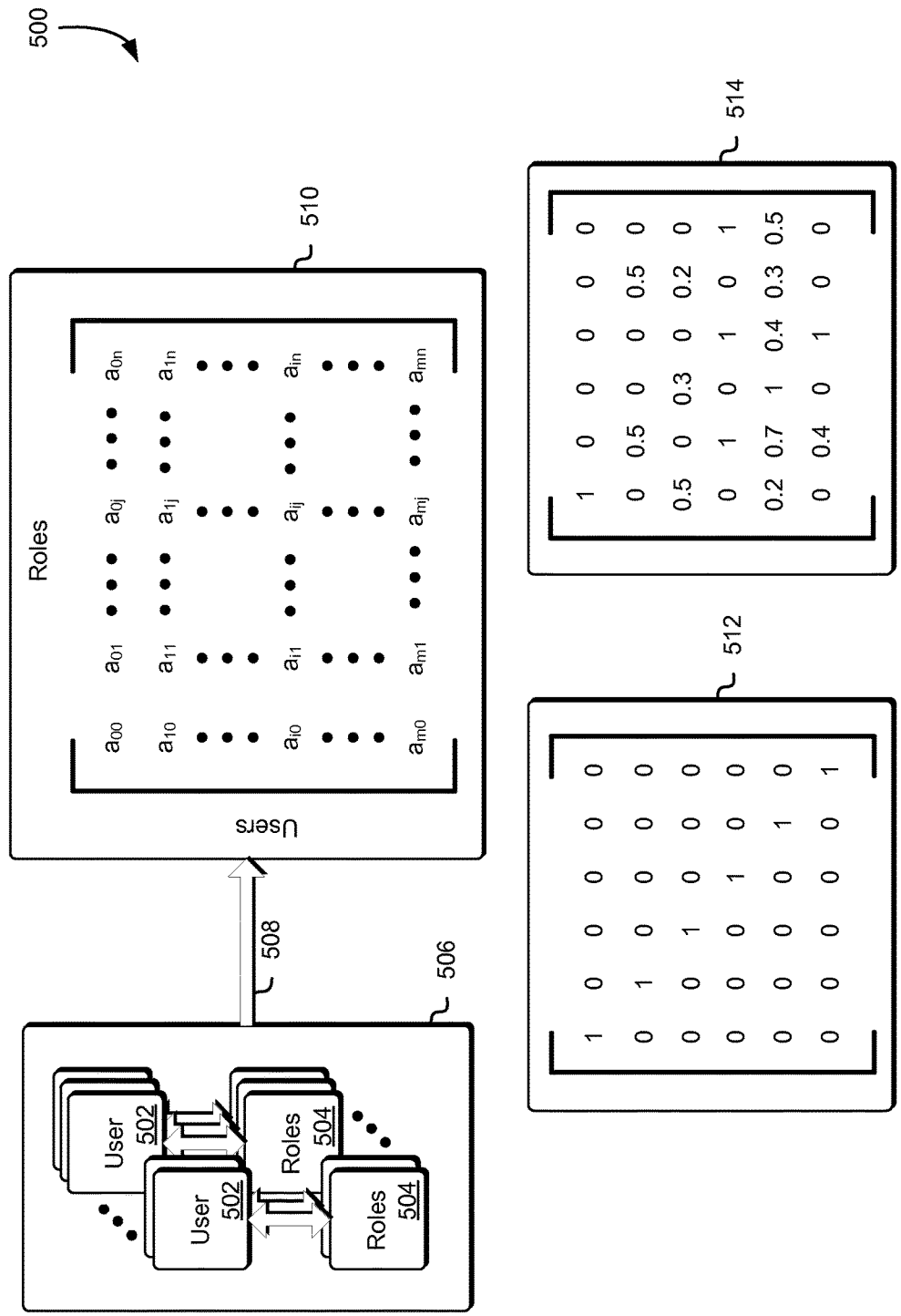
FIG. 5 illustrates an example environment where users and associated roles may be used to produce an initial assignment matrix in accordance with at least one embodiment.

FIG. 5 illustrates an example environment 500 where a plurality of users and associated roles may be represented by a role probability matrix as described herein at least in connection with FIG. 2 and in accordance with at least one embodiment. A collection 506 of a plurality of users 502 and their associated roles 504 may be represented 508 by a role probability matrix 510. Each row of the role probability matrix 510 may represent a single user, each column of the role probability matrix 510 may represent a single role and each entry of the role probability matrix 510 may represent the probability that the role represented by the column of the entry is assigned to (or associated with) the user represented by the row of the entry. An example role probability matrix 512 illustrates a collection 506 of a plurality of users 502 and their associated roles 504 where one role may be assigned to (or associated with) each user with a probability of one. In some embodiments, this one-to-one association of roles with users may have been determined by data contained in the repositories as described herein at least in connection with FIGS. 1 and 2. In some other embodiments, this one-to-one association of roles with users may be an initial guess based on randomly assigning roles to users. Another example role probability matrix 514 illustrates a collection 506 of a plurality of users 502 and their associated roles 504 where one or more roles may be assigned to (or associated with) each user with a probability of between zero and one inclusive. Again, in some embodiments, this association of roles with users may have been determined by data contained in the repositories as described herein at least in connection with FIGS. 1 and 2 or it may be an initial guess based on randomly assigning roles to users.

Figure 6:
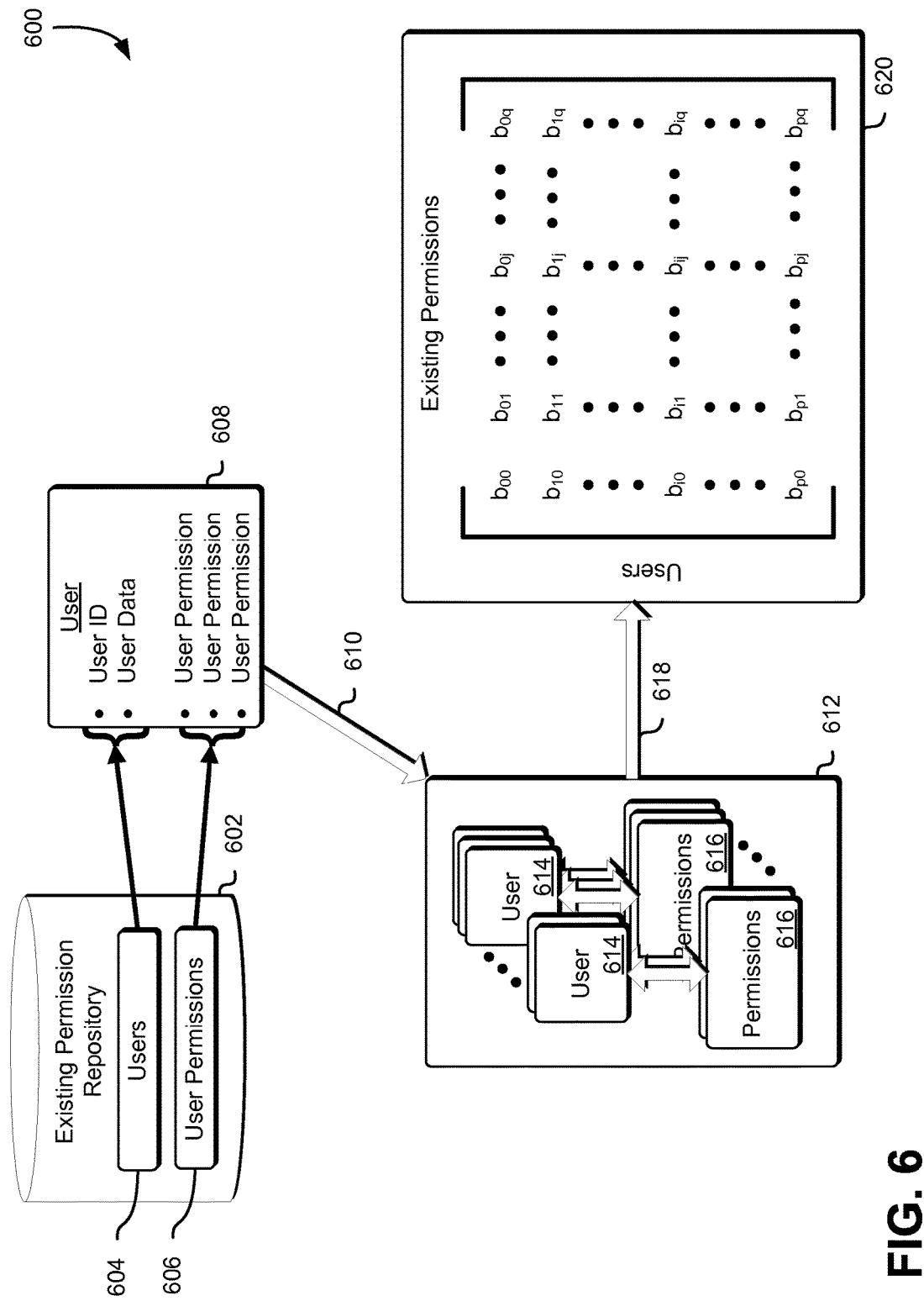
FIG. 6 illustrates an example environment where one or more existing users and associated permissions may be used to produce an existing permission matrix in accordance with at least one embodiment.

FIG. 6 illustrates an example environment 600 where a plurality of users and associated permissions may be represented by a permission matrix as described herein at least in connection with FIG. 2 and in accordance with at least one embodiment. User data 604 and user permission data 606 from an existing permission repository 602 may be extracted to a user permission record 608 as described herein at least in connection with FIG. 3 and in accordance with at least one embodiment. The user data extracted may include data necessary to identify a user such as a user ID, user name, user phone number and/or other such data that may be specific to a user and not potentially shared by other users within an organization. The user data extracted may also include data relating specifically to user permissions including, but not limited to, usernames, passwords, access control list, private and/or public keys, user specific policies and/or other such user permission data. The user permission data extracted may include such information as data from access control lists, resource lists, private and/or public keys, system policies, permissions and/or other such permission data.

The user permission record 608 entries may be collected 610 into a collection 612 of a plurality of users and their corresponding permissions. The collection 612 of the plurality of users 614 and their associated permissions 616 may then be represented 618 by a permission matrix 620. Each row of the permission matrix 620 may represent a single user of users 614, each column of the permission matrix 620 may represent a single permission of the associated permissions 616 and each entry of the permission matrix 620 may represent whether the permission represented by the column of the entry is associated with the user represented by the row of the entry. As described herein at least in connection with FIG. 2, the permission matrix based on the existing permission repository may be used by the role assigner to aid in evaluating an objective function to determine the acceptability of a particular proposed assignment of roles to users. For example, an objective function that evaluates a proposed solution based at least in part on the correctness of role assignments represented by a role probability matrix may use the permission matrix to determine whether a role assigned to a user comprises the permissions assigned to that user in the permission matrix.

Figure 7:
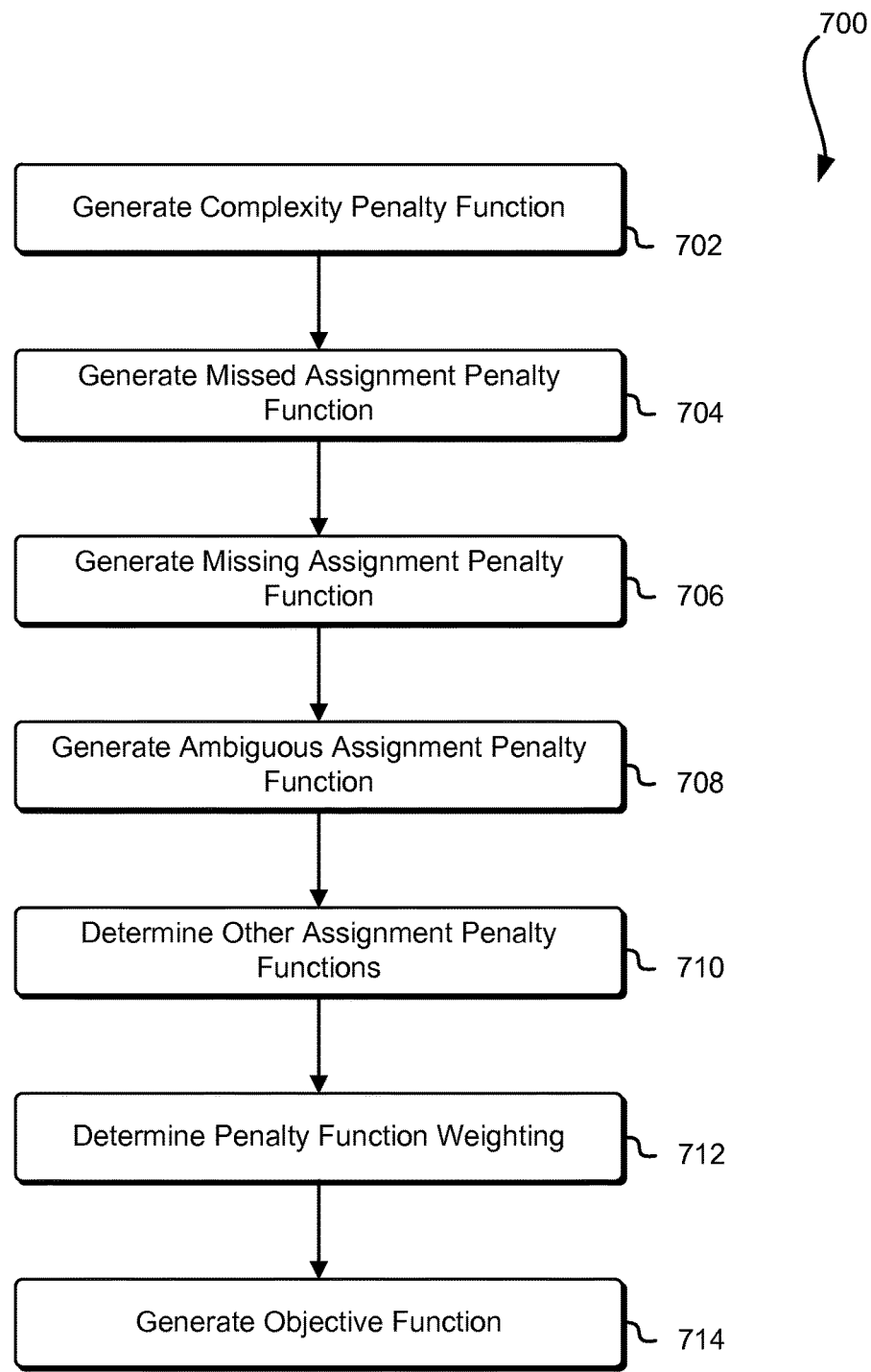
FIG. 7 illustrates an example process for generating an objective function that may be used to evaluate the fitness of an assignment matrix in comparison to an existing permission matrix in accordance with at least one embodiment.

FIG. 7 illustrates an example process 700 for generating an objective function based at least in part on one or more penalty functions that may be used for evaluating the utility of a solution to assigning roles to users as described herein at least in connection with FIG. 2 and in accordance with at least one embodiment. A role assigner such as the role assigner 122 described at least in connection with FIG. 1 may perform some or all of the process illustrated in FIG. 7. Other entities operating within a computing system may also perform at least a portion of the process illustrated in FIG. 7 including, but not limited to, services, applications, modules, processes, operating system elements, virtual machine elements, network hardware, controlling domains (e.g. a hypervisor) or combinations of these and/or other such entities operating within the computing system.

A role assigner may first create a complexity penalty function 702. A complexity penalty function may penalize a prospective solution for having more complexity. An example of a complexity penalty function may be a function that counts the number of roles in a role assignment matrix that have one or more probabilities of users being assigned to that role that are essentially non-zero (greater than a small threshold value). Another example of a complexity penalty function may be a function that measures the number of roles with essentially non-zero probabilities and combines that measurement with an additional measurement based on the number of different roles that may be assigned to a particular user and/or the number of different users that may have a particular role assigned. As may be contemplated, the examples of complexity penalty functions described herein are illustrative examples and other complexity penalty functions may be considered as within the scope of the present disclosure.

The role assigner may next create a missed assignment penalty function 704. A missed assignment penalty function is a function establishing a penalty for missed role assignments. A missed role is a role that may be required by the system, but that has no users. Missed role assignments may be determined from the permission matrix and/or may be determined by querying the existing permission repository described herein. An example of a missed role assignment penalty function may be a function that totals the number of roles without assigned users. Another example of a missed role assignment penalty function may be a function that evaluates the importance of roles and establishes higher weightings (or penalties) for those roles that the role assigner deems more important. Roles may be deemed more important due to system needs, security needs, business value and/or other such condition weights. As may be contemplated, the examples of missed assignment penalty functions described herein are illustrative examples and other missed assignment penalty functions may be considered as within the scope of the present disclosure.

The role assigner may next create a missing assignment penalty function 706. A missing assignment penalty function is a function establishing a penalty for missing permission assignments. A missing permission assignment is a permission that should be assigned to a user, but that is not assigned to that user or a permission that should not be assigned to a user, but that is assigned to that user. As above, missing permission assignments may be determined from the permission matrix and/or may be determined by querying the existing permission repository described herein. An example of a missing permission assignment penalty function may be a function that queries the roles and/or permissions that should be assigned to a user and that totals the number of permissions that are incorrectly assigned. Another example of a missing permission assignment penalty function may be a function that evaluates the importance of permissions with respect to each user and establishes higher weightings (or penalties) for those permissions that the role assigner deems more important. As above, permissions may be deemed more important due to system needs, security needs, business value and/or other such condition weights. As may be contemplated, the examples of missing assignment penalty functions described herein are illustrative examples and other missing assignment penalty functions may be considered as within the scope of the present disclosure.

The role assigner may then create an ambiguous assignment penalty function. An ambiguous assignment penalty function is a function establishing a penalty for ambiguous role assignments. An ambiguous role assignment is a role assignment that is indeterminate such as, for example, a role that is assigned to a user with a probability near 0.5. An example of an ambiguous role assignment penalty function may be a function that, for each user and/or role, establishes a penalty of one minus twice the absolute value of the difference between the probability of an assignment and 0.5. Such a penalty would be 1.0 for a probability of 0.5, 0.8 for a probability of 0.4 or 0.6 and so on. Another example would be an ambiguous role assignment penalty which is non-linear, establish a weighted higher penalty for probabilities that approach 0.5. Another example of a missing role assignment penalty function may be a function that evaluates the importance of roles with respect to each user and establishes higher ambiguous assignment weightings (or penalties) for those roles that the role assigner deems more important. As above, roles may be deemed more important due to system needs, security needs, business value and/or other such condition weights. As may be contemplated, the examples of ambiguous assignment penalty functions described herein are illustrative examples and other ambiguous assignment penalty functions may be considered as within the scope of the present disclosure.

In some embodiments, the role assigner may next determine whether there may be any other penalty functions 710 to be created including, but not limited to, functions based on certain roles, on certain users, system needs, business value, system polices and/or other such functions. As may be contemplated, the other types of penalty functions described are illustrative examples and other types of penalty functions may be considered as within the scope of the present disclosure. The role assigner may then determine whether the penalty functions should be weighted relative to one another 712 and may assign weights to the generated penalty functions based upon that determination. For example, the role assigner may be configured to assign a higher importance to penalizing ambiguous assignments and may consequentially assign a higher weight to the ambiguous assignment penalty function. The role assigner may finally generate an objective function based at least in part on the generated penalty functions and/or on the assigned weights.

Figure 8:
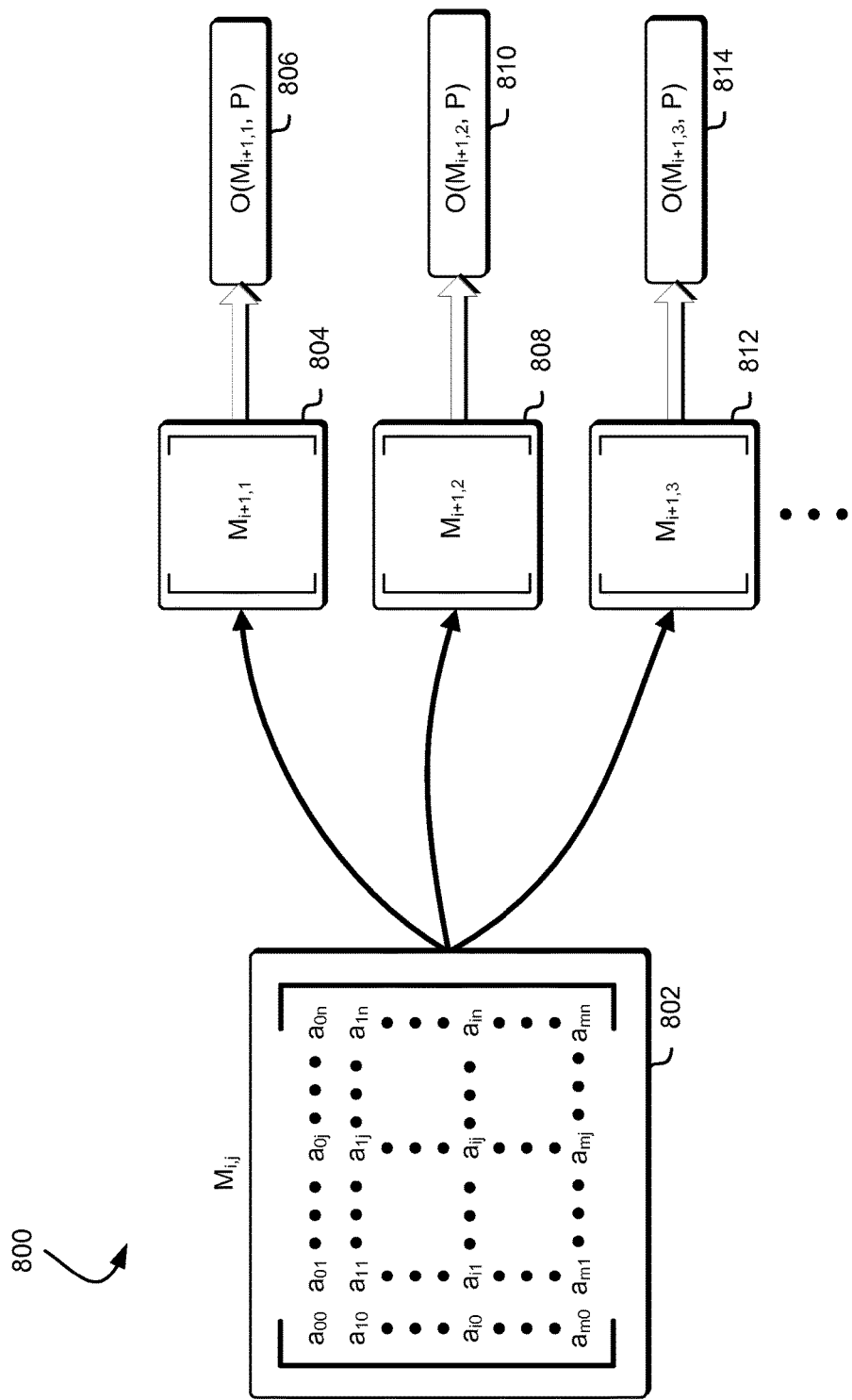
FIG. 8 illustrates an example environment where a role probability matrix may be altered and the fitness of the matrix may be scored based at least in part on an objective function in accordance with at least one embodiment.

FIG. 8 illustrates an example environment 800 where a role probability matrix may be iteratively altered in order to determine a solution for assigning roles to users as described herein at least in connection with FIG. 2 and in accordance with at least one embodiment. A role probability matrix 802 such as the role probability matrix 510 described herein at least in connection with FIG. 5 may be produced after one or more iterations of the processes described herein at least in connection with FIGS. 2, 4, 5 and 7. The role probability matrix 802 (denoted $M_{i,j}$ here), may be matrix j of iteration i produced by the processes illustrated herein at least in connection with FIGS. 2, 4, 5 and 7. One or more matrices (which may be matrices of generation i+1) such as matrix 804, matrix 808 and/or matrix 812 may be generated from role probability matrix 802 by altering one or more of the entries in role probability matrix 802.

For example, matrix 804 (denoted $M_{i+1,1}$ here) may be generated by removing one or more columns from role probability matrix 802 which do not any entries greater than a threshold value. The effect of such an alteration may be to remove one or more roles that may have no users assigned to that role. In another example, matrix 808 (denoted $M_{i+1,2}$ here) may be generated by normalizing one or more rows from role probability matrix 802. The effect of such normalization may be to ensure that one or more users do not have a total probability of greater than one of being assigned to a set of roles. In another example, matrix 812 (denoted $M_{i+1,3}$ here) may be generated by randomly altering one or more entries in one or more rows and/or one or more columns. The effect of such a randomization may be to more effectively reach a solution for the assignment of roles to users when using, for example, a metaheuristic optimization algorithm. In some embodiments, a plurality of such alterations may be used to generate a corresponding plurality of candidate matrices in generation i+1. For example, each matrix may be generated by altering a single row or column, or each matrix may be generated by altering a combination of rows or columns according to a single type of alteration, or each matrix may be generated by altering a combination of rows or columns using multiple types of alterations or each matrix may be altered by using other such methods of alteration. As may be contemplated, the types of alterations that may be used to generate new candidate matrices described herein as well as the combinations of those alterations are illustrative examples and other types of alterations that may be used to generate new candidate matrices described herein as well as the combinations of those alterations may be considered as within the scope of the present disclosure.

In some embodiments, following the generation of the plurality of candidate solution matrices, one or more scores may be generated that may be used to evaluate whether the candidate solution matrix may represent a usable solution for assigning roles to users. The scores may be generated based on evaluating an objective function ("O") such as the objective function described herein at least in connection with FIGS. 1 and 7. The inputs to the objective function may include a candidate matrix ("$M_{i+1,j}$"), a permission matrix ("P") such as the permission matrix 620 described herein at least in connection with FIG. 6 and/or other such inputs. In the example illustrated in FIG. 8, a score 806 for matrix 804 may be generated using objective function O, a score 810 for matrix 808 may be generated using objective function O, a score 814 for matrix 812 may be generated using objective function O and other scores may be generated for others of the plurality of candidate matrices using objective function O.

The generated scores such as score 806, score 810 and score 814 may then be used to select some of the matrices for further processing, deselect some of the matrices as not being viable candidates, select some of the matrices as being usable solutions or other such score processing. For example, any matrix with a score below a first threshold value may be removed from the list of matrices. Similarly, any matrix with a score above a second threshold value may be selected for further processing and, in some embodiments, the processing of the higher scoring matrices may be selected before those with lower scores. In some embodiments, a score above a third threshold value may be selected as a solution to assigning roles to users. Scores may be selected for processing and/or culling based on considerations such value, weighted value, random selection, random factor weighting, business value and/or other such score considerations. Thresholds may be selected and/or adjusted based on considerations such as business value, processing time, resource availability, selection algorithm choice, iteration algorithm choice, alteration algorithm choice, search space size and/or other such considerations.

Figure 9:
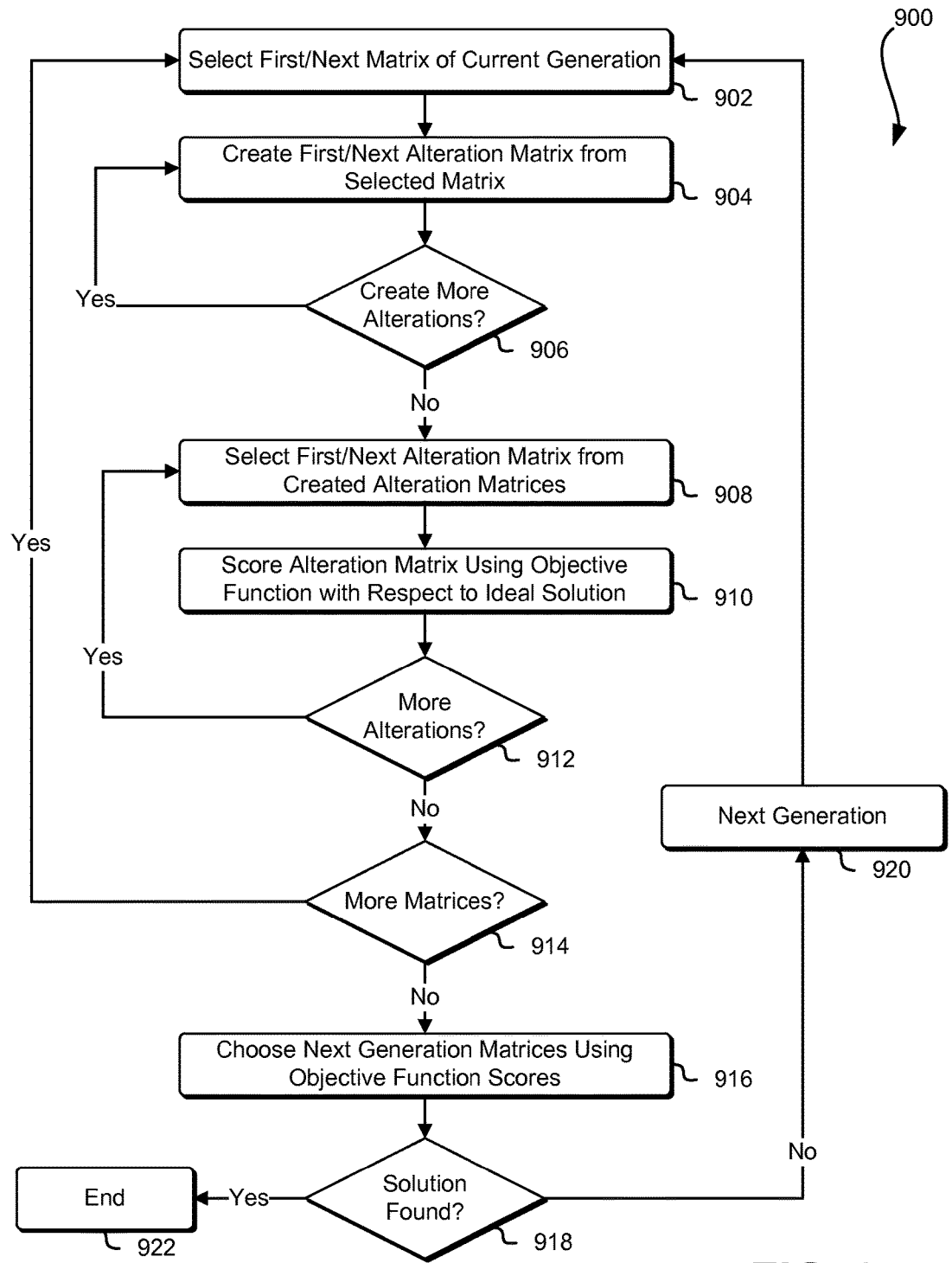
FIG. 9 illustrates an example process for selecting and evaluating the fitness of one more permutations of an assignment matrix in accordance with at least one embodiment.

FIG. 9 illustrates an example process 900 for generating and evaluating role probability matrices as potential solutions to the assignment of roles to users as described herein at least in connection with FIG. 2 and in accordance with at least one embodiment. A role assigner such as the role assigner 122 described at least in connection with FIG. 1 may perform some or all of the process illustrated in FIG. 9. Other entities operating within a computing system may also perform at least a portion of the process illustrated in FIG. 9 including, but not limited to, services, applications, modules, processes, operating system elements, virtual machine elements, network hardware, controlling domains (e.g. a hypervisor) or combinations of these and/or other such entities operating within the computing system.

A role assigner may first select a first role probability matrix from a current generation of matrices 902. For the first generation, the matrix may be one of one or more initial probability matrices such as the initial guess probability matrix described herein. The role assigner may then create one or more alteration matrices based at least in part on the selected matrix 904. The alterations may be based on perturbing one or more values of the selected matrix as described herein. The role assigner may then determine 906 whether to continue creating alteration matrices based on the selected matrix until a sufficient number of alteration matrices have been created. In some embodiments, the number of alteration matrices created may depend on the type and/or nature of the optimization approach. For example, in a gradient descent optimization approach, the role assigner may only create a single alteration matrix that conforms to an appropriate descent of the gradient while in a simulated annealing approach, the role assigner may create a plurality of alteration matrices to increase coverage of the search space. As may be contemplated, the number of alteration matrices and/or the method used to determine that number are illustrative examples and other numbers and/or methods may be considered as within the scope of the present disclosure.

When the role assigner determines that a sufficient number of alteration matrices have been created, the role assigner may then begin selecting the created alteration matrices 908 and may score one or more of the created alteration matrices using an objective function 910 as described herein at least in connection with FIG. 2 and in accordance with at least one embodiment. The role assigner may continue scoring matrices using the objective function while there are more alterations to score 912. The role assigner may also continue generating alteration matrices from candidate matrices in the current generation while there are more candidate matrices 914. The first generation may only have a single candidate matrix, while later generations may have a plurality of candidate matrices. The role assigner may then select one or more matrices from the alteration matrices to form the basis of the next generation of an iterative algorithm based at least in part on the objective function scores 916. The role assigner may also determine whether one of the alteration matrices represents a viable solution to for assigning roles to users 918 and, if so, may terminate the algorithm 922 and present the solution. In the event that a solution is not found, the role assigner may start the next generation 920 of the optimization.

Figure 10:
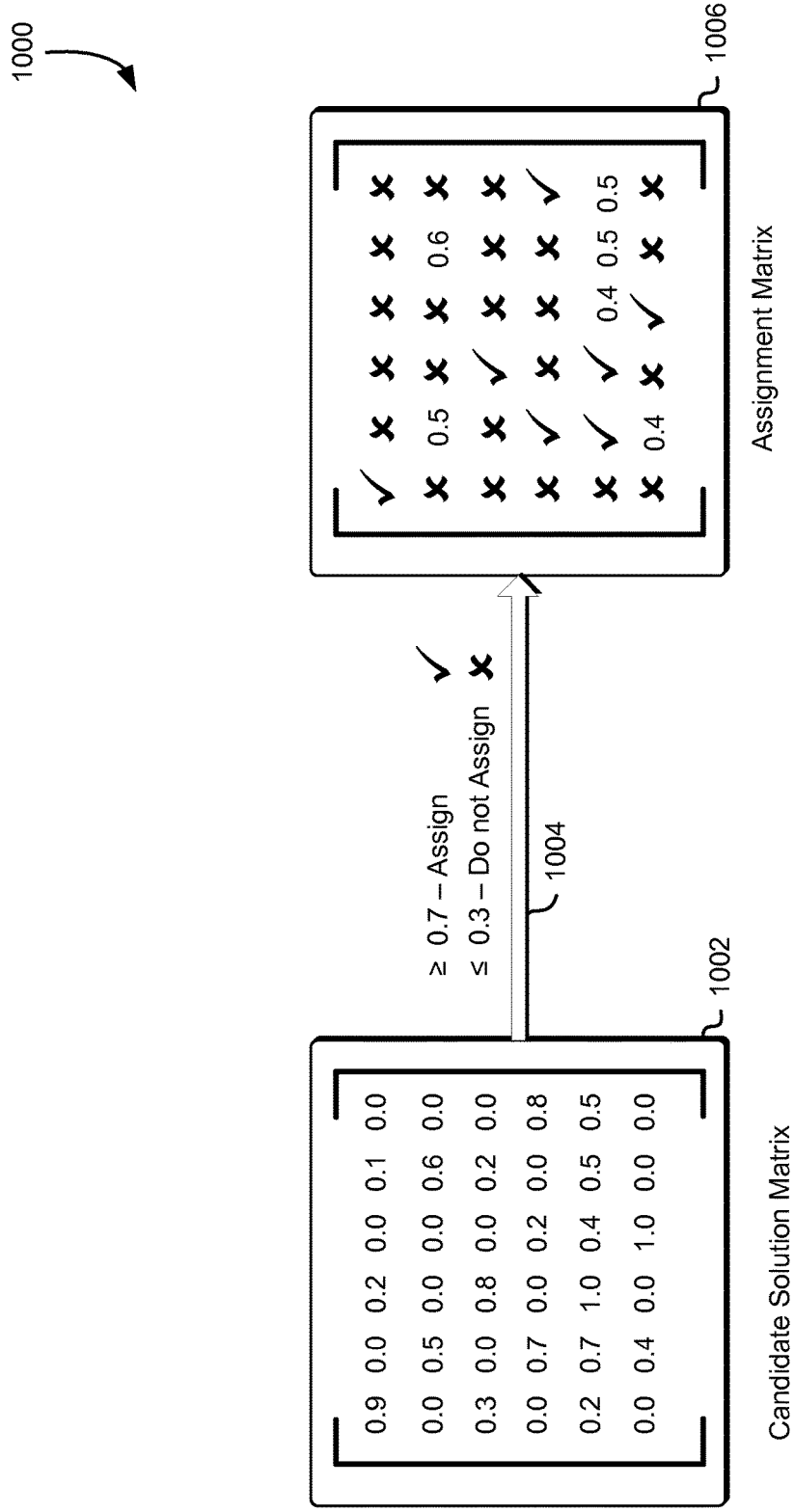
FIG. 10 illustrates an example environment where roles may be assigned to users according to a candidate solution matrix in accordance with at least one embodiment.

FIG. 10 illustrates an example environment 1000 where a candidate solution matrix may be used to assign one or more roles to one or more users as described herein at least in connection with FIG. 2 and in accordance with at least one embodiment. A candidate solution matrix 1002 such as one of the candidate solution matrices described herein at least in connection with FIGS. 8 and 9 may be evaluated against one or more threshold values to determine how roles may be assigned to users. In the example illustrated in FIG. 10, threshold rules 1004 indicate that any entry in the candidate solution matrix 1002 with a probability greater than or equal to 0.7 indicate that the role associated with the column of the entry may be assigned to the user associated with the row of the entry. The threshold rules 1004 also indicate that any entry in the candidate solution matrix 1002 with a probability less than or equal to 0.3 indicate that the role associated with the column of the entry may not be assigned to the user associated with the row of the entry. The assignment matrix 1006 shows the result of applying threshold rules 1004, with check marks for automatically assigned roles, X's for not assigned roles and probabilities for those entries that are greater than 0.3 and less than 0.7.

Figure 11:
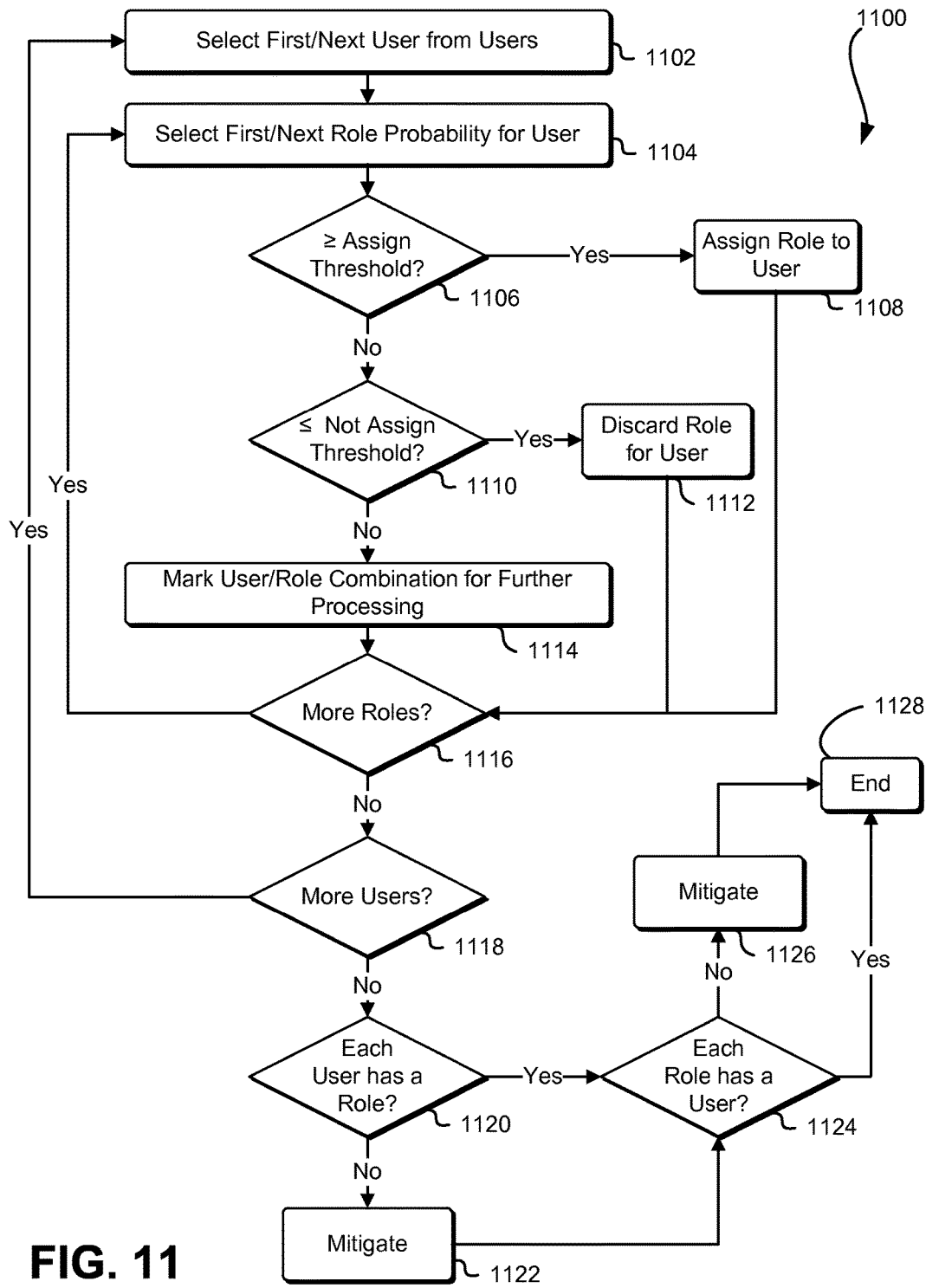
FIG. 11 illustrates an example process for assigning roles to users, discarding roles and marking roles for further processing in accordance with at least one embodiment.

FIG. 11 illustrates an example process 1100 where assigning roles to users based on a proposed solution role probability matrix as described herein at least in connection with FIG. 2 and in accordance with at least one embodiment. A role assigner such as the role assigner 122 described at least in connection with FIG. 1 may perform some or all of the process illustrated in FIG. 11. Other entities operating within a computing system may also perform at least a portion of the process illustrated in FIG. 11 including, but not limited to, services, applications, modules, processes, operating system elements, virtual machine elements, network hardware, controlling domains (e.g. a hypervisor) or combinations of these and/or other such entities operating within the computing system.

A role assigner may select a first user from the users 1102 represented by the role probability matrix and may then begin selecting the role probabilities 1104 from the role probability matrix for that user. If the role probability is greater than or equal to an assignment threshold 1106, the role assigner may execute one or more instructions 1108 to assign that role to that user. If the role probability is less than or equal to a threshold 1110 below which a user is definitely not assigned to a role, the role assigner may instead discard that role for that user 1112. If a role is neither definitely assigned nor definitely not assigned, the role assigner may, in some embodiments, mark the entry in the role assignment matrix for further processing 1114. The further processing may include generating an anomaly report as described herein at least in connection with FIG. 2 in accordance with at least one embodiment. The role assigner may continue assigning, discarding and/or marking until there are no more roles 1116 and no more users 1118. In some embodiments, the role assigner may evaluate whether each user has at least one role 1120 and if not may attempt to mitigate 1122 that issue by, for example, adding such information to the anomaly report. The role assigner may also evaluate whether each role has at least one user 1124 and if not may also attempt to mitigate that issue 1126. After such additional work, the process may end 1128.

Figure 12:
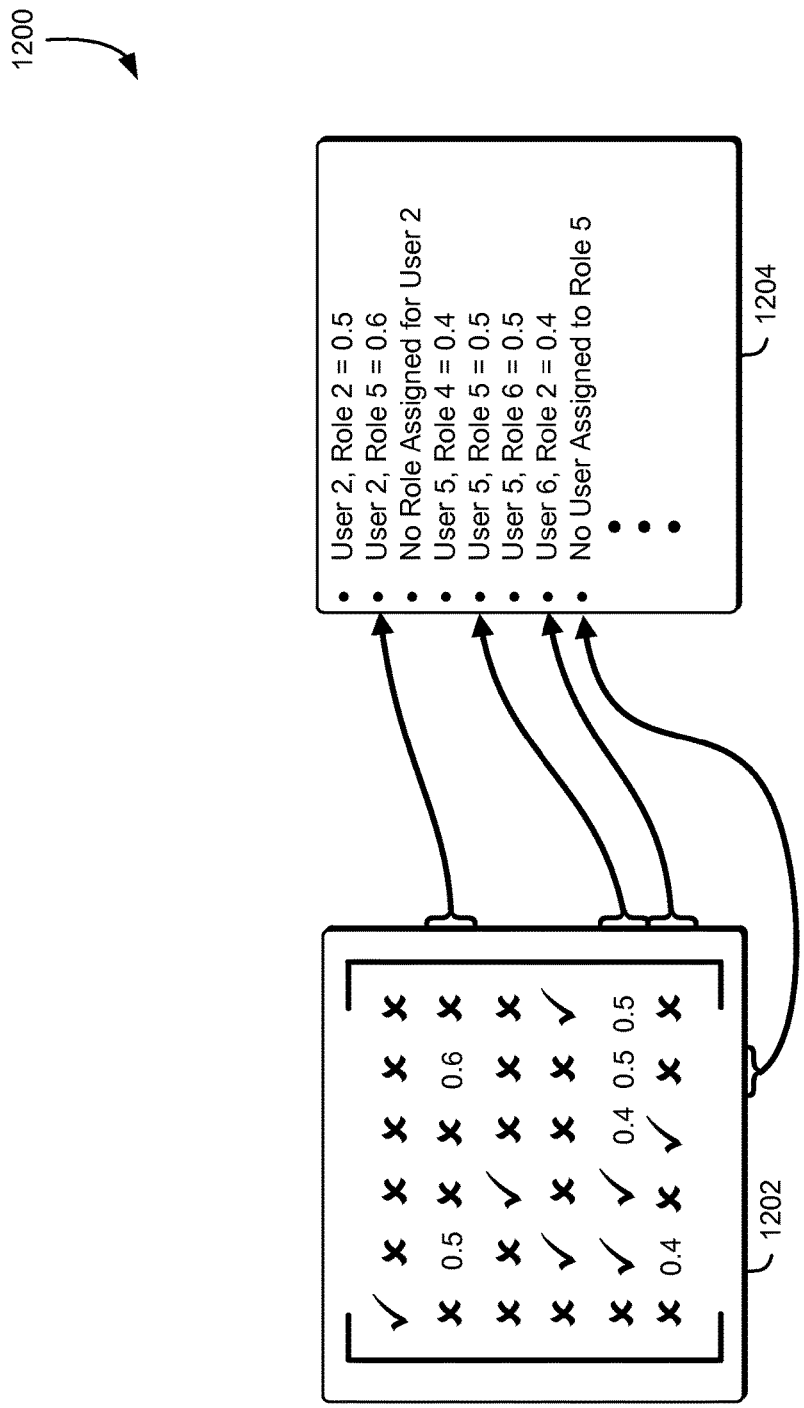
FIG. 12 illustrates an example environment where an anomaly report may be generated in accordance with at least one embodiment.

FIG. 12 illustrates an example environment 1200 where entries from a candidate solution matrix may be used to generate an anomaly report as described herein at least in connection with FIG. 2 and in accordance with at least one embodiment. A candidate solution matrix 1202 such as the assignment matrix 1006 as described herein at least in connection with FIG. 10 may be further analyzed for anomalies and such anomalies may be used to generate an anomaly report 1204. Examples of such anomalies may include entries in the candidate solution matrix 1202 which are less than an automatic assignment threshold value but greater than a minimum threshold value as described herein at least in connection with FIG. 10 and in accordance with at least one embodiment. In the example illustrated in FIG. 12, several combinations of roles and users have uncertain probability entries indicating that the iterative algorithm was not able to definitively associate or not associate those roles with those users. In some embodiments, the presence of the uncertain entries may indicate that it may be beneficial to place a higher weighting on a penalty function associated with assignment uncertainty in order to reduce and/or eliminate such uncertain entries.

The example illustrated with FIG. 12 also reports that the solution has failed to produce a role associated with user 2 or a user for role 5. In some embodiments, users without roles may be acceptable such as when, for example, a user has no permissions. In some embodiments, roles without users may also be acceptable such as when, for example, the role is temporary, redundant, seasonal and/or other such cases. In some embodiments, the anomaly report may be used to, for example, manually assign a role to user 2 or to delete role 5. As may be contemplated, the example entries in the anomaly report and the example responses to such entries are illustrative examples and other such anomaly types and responses may be considered as within the scope of the present disclosure.

Figure 13:
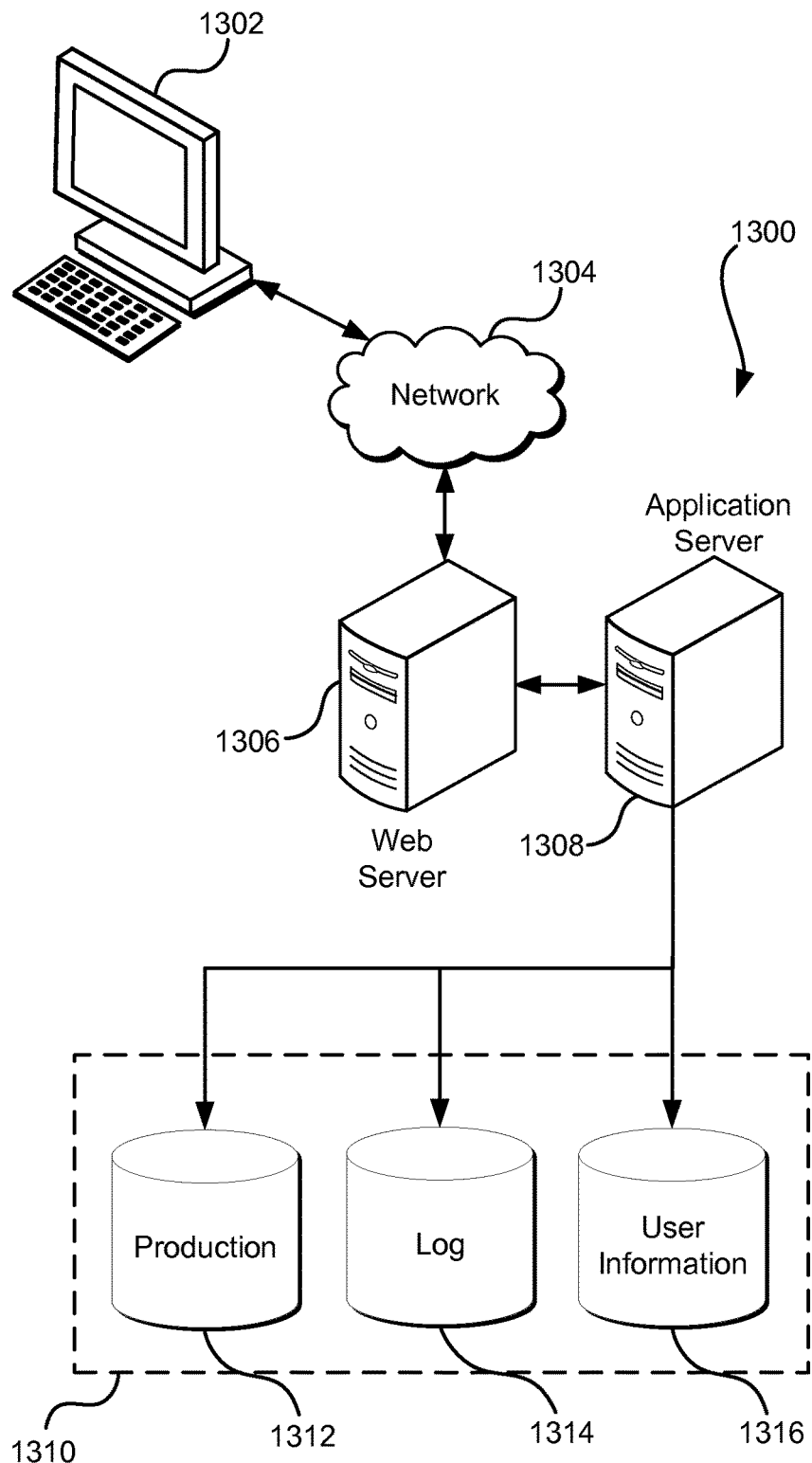
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for assigning one or more roles to one or more users of a computing system, the one or more roles usable in determining how the computing system provides access to the one or more users to computing resources, the method comprising:
   under the control of one or more computer systems configured with executable instructions,
      creating the one or more roles based at least in part on one or more user data items retrieved from a data storage repository, the one or more user data items associated with the one or more users, the one or more user data items further specifying a set of user permissions associated with the one or more users, the set of user permissions used in the computer system for controlling access to computing resources;
      creating a set of role probability matrices comprising at least an initial role probability matrix, the initial role probability matrix based at least in part on one or more associations between the one or more users and the one or more roles;
      adding one or more new probability matrices to the set of role probability matrices by iteratively, using one or more processors of the one or more computer systems:
         selecting a first role probability matrix from the set of role probability matrices;
         adding one or more second role probability matrices to the set of role probability matrices, the one or more second role probability matrices based at least in part on altering one or more entries of the first role probability matrix; and
         producing a matrix score associated with the one or more second role probability matrices, the matrix score based at least in part on an objective function, the objective function based at least in part on minimizing one or more penalty functions, the one or more penalty functions based at least in part on an assignment of one or more of permissions to one or more of the one or more users, the one or more of permissions based at least in part on one or more of the one or more roles, the assignment configured to preserve at least a subset of the set of user permissions associated with the one or more users;
      selecting a solution role probability matrix from the set of role probability matrices based at least in part on a relative error between the matrix score and a target matrix score; and
      assigning one or more of the one or more roles to one or more of the one or more users based at least in part on the solution role probability matrix.

2. The computer-implemented method of claim 1, wherein the one or more penalty functions include at least one of:
   a penalty function based at least in part on a number of roles,
   a penalty function based at least in part on a number of roles improperly assigned to users, or
   a penalty function based at least in part on an uncertainty of one or more entries in the solution role probability matrix.

3. The computer-implemented method of claim 1, further comprising, as a result of selecting the solution role probability matrix from the set of role probability matrices:
   identifying one or more anomalous assignments, wherein the one or more anomalous assignments incorrectly assign a first subset of the one or more roles to a second subset of the one or more users; and
   generating a report of the one or more anomalous assignments.

4. The computer-implemented method of claim 3, wherein identifying the one or more anomalous assignments is based on one or more conditions that include at least one of:
   an uncertain probability associated with one or more of the first subset of the one or more roles being assigned to one or more of the second subset of the one or more users,
   one or more of the second subset of the one or more users with no associated role, or
   one or more of the first subset of the one or more roles with no associated user.

5. A system, comprising:
   at least one computing device configured to implement one or more services, the one or more services configured to:
      create one or more roles based at least in part on one or more user data items retrieved from a data storage repository, the one or more user data items associated with one or more users, the one or more user data items further specifying a set of user permissions associated with the one or more users, the set of user permissions used in a computing system for controlling access to computing resources;

create a set of role probability matrices comprising at least an initial role probability matrix, the initial role probability matrix based at least in part on one or more associations between one or more users of the computing system and one or more roles;

perform an iterative process comprising multiple rounds, wherein an individual round of the multiple rounds includes:

selecting the initial role probability matrix from the set of role probability matrices;

adding, based at least in part on a matrix score, one or more second role probability matrices to the set of role probability matrices, the one or more second role probability matrices being based at least in part on altering one or more entries of a role probability matrix based at least in part on the initial role probability matrix of the set of role probability matrices; and producing the matrix score based at least in part on an objective function, the objective function based at least in part on minimizing one or more penalty functions, the one or more penalty functions based at least in part on an assignment of one or more of permissions to one or more of the one or more users, the one or more of permissions based at least in part on one or more of the one or more roles, the assignment configured to preserve at least a subset of the set of user permissions associated with the one or more users;

select, based at least in part on the matrix score, a solution role probability matrix from the set of role probability matrices; and perform one or more operations to assign one or more of the one or more roles to one or more of the one or more users based at least in part on the solution role probability matrix.

6. The system of claim 5, wherein the solution role probability matrix is selected based at least in part on a relative error between the matrix score and a target matrix score.

7. The system of claim 5, wherein one or more of the one or more services is further configured to automatically assign, based at least in part on one or more entries in the solution role probability matrix being greater than a threshold value, a first subset of the one or more roles to a second subset of the one or more users.

8. The system of claim 5, wherein the one or more penalty functions include at least one of:

a penalty function based at least in part on a number of roles, a penalty function based at least in part on a number of roles improperly assigned to users, or a penalty function based at least in part on an uncertainty of one or more entries in the solution role probability matrix.

9. The system of claim 5, wherein the service configured to perform one or more operations to assign the one or more of the one or more roles to the one or more of the one or more users is further configured to:

identify, based at least in part on one or more entries in the solution role probability matrix, one or more anomalous assignments of roles to users; and generate a report of the one or more anomalous assignments of roles to users.

10. The system of claim 5, wherein the one or more user data items include at least:

a user job description, a user job code, or a user workplace location.

11. The system of claim 5, wherein the at least one computing device retrieves the set of user permissions from an access control list.

12. The system of claim 5, wherein an individual entry of the one or more entries is an estimated probability that a permission of the set of user permissions is associated with a particular user in a particular role.

13. A non-transitory computer-readable storage medium to store executable instructions which as a result of being performed by one or more processors of a computer system, cause the computer system to at least:

create one or more roles based at least in part on one or more user data items retrieved from a data storage repository, the one or more user data items associated with one or more users, the one or more user data items further specifying a set of user permissions associated with the one or more users, the set of user permissions used in the computer system for controlling access to computing resources;

create a set of role probability matrices comprising at least:

an initial role probability matrix, the initial role probability matrix based at least in part on one or more associations between one or more users of the computing system and the one or more roles;

one or more derived role probability matrices, the one or more derived role probability matrices based at least in part on altering one or more entries of one or more role probability matrices of the set of role probability matrices, wherein the set of role probability matrices comprises a role probability matrix that is iteratively derived from the initial role probability matrix;

add the one or more derived role probability matrices to the set of role probability matrices; and produce a matrix score associated with the one or more derived role probability matrices, the matrix score based at least in part on an objective function, the objective function based at least in part on minimizing one or more penalty functions, the one or more penalty functions based at least in part on an assignment of one or more of permissions to one or more of the one or more users, the one or more of permissions based at least in part on one or more of the one or more roles, the assignment configured to preserve at least a subset of the set of user permissions associated with the one or more users;

select, based at least in part on a matrix score, a solution role probability matrix from the set of role probability matrices, the matrix score based at least in part on an objective function; and cause one or more operations to be executed based at least in part on one or more entries in the solution role probability matrix.

14. The non-transitory computer-readable storage medium of claim 13, wherein the solution role probability matrix is selected based at least in part on a relative error between the matrix score and a target matrix score.

15. The non-transitory computer-readable storage medium of claim 13, wherein the executable instructions further cause the computer system to automatically assign, based at least in part on one or more entries in the solution role probability matrix being greater than a threshold value, a first subset of the one or more roles to a second subset of the one or more users.

16. The non-transitory computer-readable storage medium of claim 13, wherein the one or more penalty functions include at least one of:
- a penalty function based at least in part on a number of roles,
- a penalty function based at least in part on a number of roles improperly assigned to users, or
- a penalty function based at least in part on an uncertainty of one or more entries in the solution role probability matrix.

17. The non-transitory computer-readable storage medium of claim 13, wherein the executable instructions that cause the computer system to create the set of role probability matrices further cause the computer system to create the set of role probability matrices using a meta-heuristic algorithm.

18. The non-transitory computer-readable storage medium of claim 13, wherein the executable instructions that cause the computer system to create the set of role probability matrices further cause the computer system to create the set of role probability matrices using a numerical optimization algorithm.

19. The non-transitory computer-readable storage medium of claim 13, wherein the data storage repository stores a management structure of an organization.

20. The non-transitory computer-readable storage medium of claim 13, wherein altering the one or more entries include one or more of:
- perturbing a value of the one or more entries,
- removing a role from the one or more derived role probability matrices, the one or more entries being associated with the role, or
- normalizing the one or more entries with one or more other entries in the one or more derived role probability matrices.

* * * * *